(12) United States Patent
Belcher

(10) Patent No.: US 7,123,826 B2
(45) Date of Patent: Oct. 17, 2006

(54) TEMPERATURE CONTROLLED PIPE AND METHOD OF MANUFACTURING SAME

(75) Inventor: John Robert Belcher, Panama City, FL (US)

(73) Assignee: Wellstream International Ltd., London (GB)

( * ) Notice: Subject to any disclaimer, the term of this patent is extended or adjusted under 35 U.S.C. 154(b) by 182 days.

(21) Appl. No.: 10/620,826

(22) Filed: Jul. 16, 2003

(65) Prior Publication Data

US 2005/0011572 A1 Jan. 20, 2005

(51) Int. Cl.
*F24H 1/10* (2006.01)
(52) U.S. Cl. .................................... 392/478; 392/465
(58) Field of Classification Search ................. 392/478, 392/480
See application file for complete search history.

(56) References Cited

U.S. PATENT DOCUMENTS

| | | | |
|---|---|---|---|
| 4,156,127 A | 5/1979 | Sako et al. | |
| 4,429,213 A | 1/1984 | Mathieu | |
| 5,081,326 A | 1/1992 | Usui | |
| 5,713,864 A | 2/1998 | Verkaart | |
| 5,730,188 A | 3/1998 | Kalman et al. | |
| 5,862,303 A | 1/1999 | Adar et al. | |
| 6,039,083 A | 3/2000 | Loper | |
| 6,090,459 A | 7/2000 | Jadamus et al. | |
| 6,317,540 B1 | 11/2001 | Foulger et al. | |
| 6,363,974 B1 | 4/2002 | Perez et al. | |
| 6,422,450 B1 | 7/2002 | Zhou et al. | |
| 6,426,134 B1 | 7/2002 | Lavin et al. | |
| 6,446,672 B1 | 9/2002 | Kalman et al. | |
| 2002/0040900 A1 | 4/2002 | Arx et al. | |
| 2002/0135105 A1 | 9/2002 | Easter | |

FOREIGN PATENT DOCUMENTS

| | | |
|---|---|---|
| EP | 1054036 | 11/2000 |
| EP | 1449885 | 8/2004 |
| FR | 2840848 | 12/2003 |
| GB | 1562435 | 3/1980 |
| GB | 1572800 | 8/1980 |

OTHER PUBLICATIONS

Search Report dated Oct. 18, 2004 for British Application No. GB0415461.3, corresponding to U.S. Appl. No. 10/620,826.

*Primary Examiner*—Thor S. Campbell
(74) *Attorney, Agent, or Firm*—Klarquist Sparkman, LLP

(57) ABSTRACT

A pipe and a method of manufacturing same according to the pipe is formed, at least in part, with a tubular member formed of a plastic material, and dispersing a plurality of electrical current conductive materials in the plastic material for increasing the electrical conductivity of the tubular layer.

36 Claims, 2 Drawing Sheets

TEMPERATURE CONTROLLED PIPE AND METHOD OF MANUFACTURING SAME

BACKGROUND

The present invention relates to a temperature controlled pipe and a method of manufacturing same, and, more particularly to a pipe that can be heated.

When crude oil, gas, or other similar fluids are transported through pipes and/or risers in subsea environments, several challenges are presented with respect to designing the pipes and risers for transporting the fluids. For example, the pipes and risers must provide a fluid barrier while being resistant to collapse and penetration yet must be flexible and connectable to other equipment. Also, the temperature of the fluid flowing the pipe often must be maintained above a minimum value to insure that the conveyed fluid flows freely. For example, when the conveyed fluid is primarily methane, moisture present in the gas can form methane hydrate when the pressure is sufficient and the temperature is not sufficiently high. These, hydrates build locally and tend to clog the pipe. Also, when the conveyed fluid is crude oil with an excessive amount of wax dissolved in the oil, wax can build up on the walls of the pipe, which leads to a decreased flow in the pipe and associated oil production.

Therefore, several attempts have been made to heat flexible pipes, such as by wrapping an electric heater wire around the pipe or embedding such a wire in a layer of the pipe. However, these arrangements are less than optimum since, in general, the compositions of the various layers of pipe are not good conductors of the heat or electrical current.

The embodiments of the present invention overcome these deficiencies.

DETAILED DESCRIPTION

Figure 1:
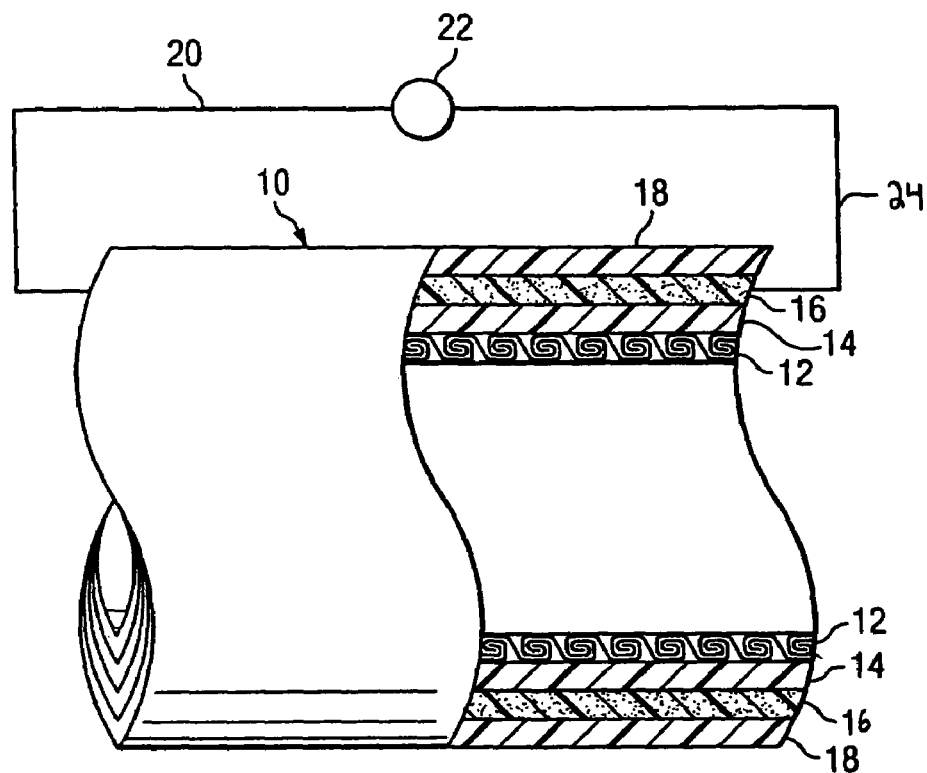
FIG. 1 is a partial elevational-partial sectional view of a pipe according to an embodiment of the invention.

Referring to the drawing, a pipe 10 is formed by an inner tubular layer 12, preferably in the form of a metallic carcass fabricated from a range of corrosion resistant stainless steel alloys depending on the fluid to be conveyed. Although the carcass can take many forms, an example would be a plurality of interlocking members as manufactured by the assignee of the present invention, and marketed under the trademark FLEXBODY.

A tubular insulating layer 14 extends around, or surrounds, the layer 12 with the inner surface of the former being in intimate contact with the outer surface of the latter. Although the layer 14 can take several forms, an example is a layer fabricated from a plastic material, such as a polymer, so as to be chemically resistant to the fluid being conveyed. Examples of the latter material are high-density polyethylene, nylon, and polyvinylidene fluoride. An example of the layer 14 is manufactured by the assignee of the present invention and marketed under the trademark FLEXBARRIER and is well disclosed in assignee's product literature and internet web site, which are hereby incorporated by reference.

A layer 16 extends around, or surrounds, the layer 14 with the inner surface of the former being in intimate contact with the outer surface of the latter. The layer 16 is used as a fluid sealing layer, and, as such, can be fabricated from one of several materials, one of which would be a polymer, and, in fact, the layer can be identical to the layer 14.

Figure 3:
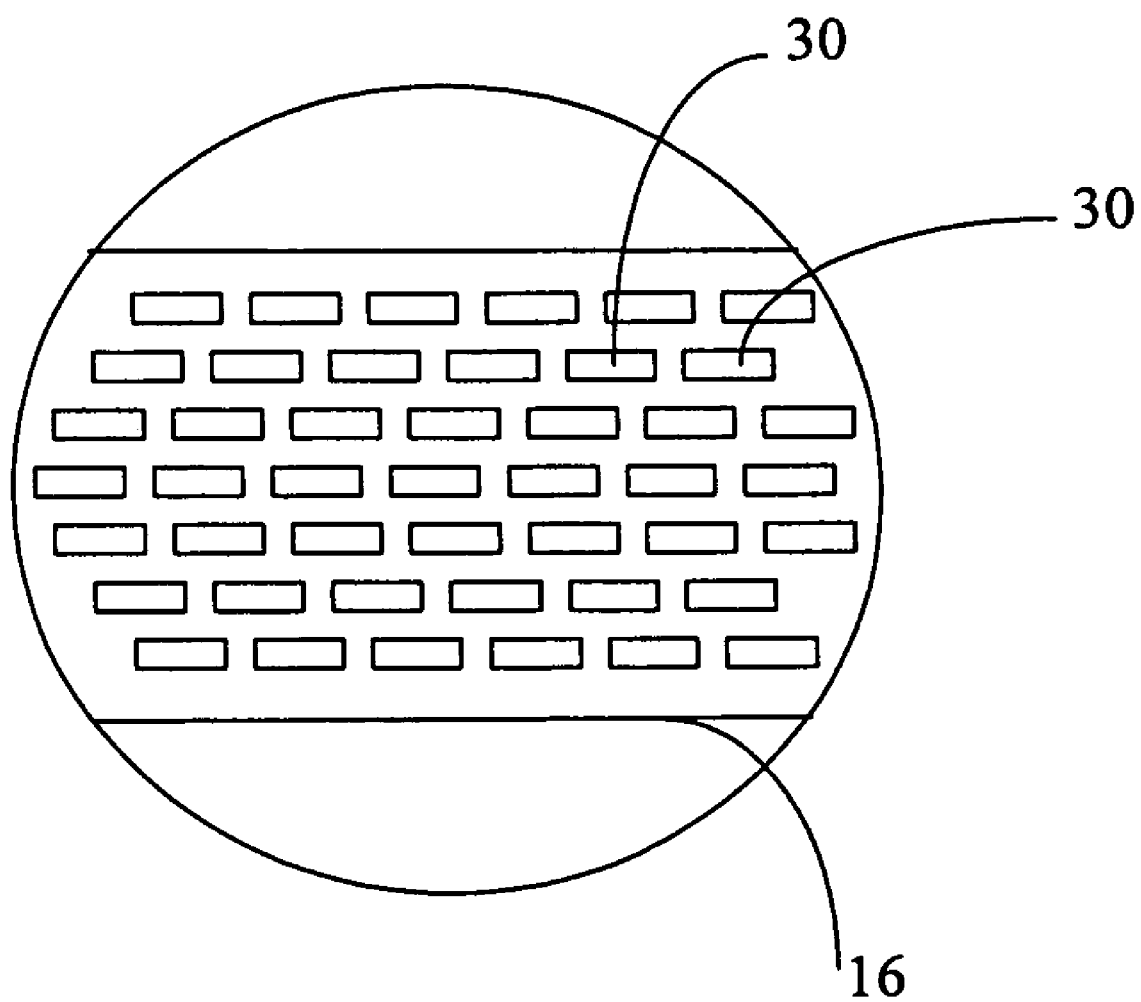
FIG. 3 is an enlarged, schematic fragmentary view of a tubular layer containing a plurality of nanotubes.

A plurality of electrically conductive, carbon materials, preferably in the form of nanotubes 30 (FIG. 3), is dispersed in the polymer forming the layer 16. This is achieved by controlled dispersion of specifically designed, highly electrically conductive, carbon nanotubes into the supporting polymer matrix during fabrication of the layer 16. The nanotubes can either have a single wall or multiple walls and are fullerenes (a convex cage of atoms with only hexagonal and/or pentagonal faces) with a diameter of approximately 1.2–1.4 nm for a single wall nanotube and somewhat larger diameter for multi-wall nanotube. The nanotube structure may vary with respect to the chiral angle (or helicity) of the arrangement of hexagonal shapes. With the proper angle, the nanotubes have a relatively high electrical conductively, substantially equal to that of copper, when compared to the polymer forming the layer 16, but with a comparatively much lower density. The nanotubes have a length-to-diameter ratio ranging from 800 to 10,000. Since the percolation (onset of conductivity) threshold for these materials is less than one half of one percent by volume, this relatively high ratio results in a much lower required filler content to achieve percolation than traditional metal filled systems. In other words, the density of the nanotubes in the layer 16 is less than the density of metal that would have to be dispersed in the layer to achieve the same electrical conductivity. As a result the pipe 10 is much lighter when compared to pipes with metal filled polymer layers.

The layer 16 is connected in an electrical circuit 20 including a power source 22 and an electrical conductor 24. Although not shown in the drawings, it is understood that the conductor 24 extends through the layer 16 or is wrapped around the latter layer. Application of electrical power, in the form of alternating current or direct current, from the source 22 to the circuit 20 causes the current to pass through the conductor 24 and heat the layer 16. Due to the high thermal conductively of the above-mentioned nanotubes, the pipe 10 is heated to relatively high temperatures by the electrical energy from the source 22. It is understood that the amount of electrical power flowing through the conductor 24 and the layer 16 can be varied to control the temperature of the pipe 10 and the fluid conveyed by the pipe.

An outer layer 18, in the form of a sheath, extends around, or surrounds, the layer 16 with the inner surface of the former being in intimate contact with the outer surface of the latter. The layer 18 can take several forms, and an example would be a layer fabricated from a plastic material, such as a polymer, and, in fact, the layer can be identical to the layer 16.

Although not shown in the drawing, it is understood that an armor layer can be wrapped around the any one of the layers 12, 14, and 16 to add strength to the pipe 10. This armor layer would be designed to provide resistance to internal and external pressure in the hoop direction, and can take several forms. For example, the armor layer could be formed by circumferentially winding one or more wires, having a circular or rectangular cross-section and formed of carbon steel, around the layer 12, 14, and/or 16, with adjacent windings being interlocked, to form an armor layer. An example of the armor layer is manufactured by the assignee of the present invention and marketed under the trademark FLEXLOK.

An additional armor layer can also be provide in addition to, or in place of, the above armor layer, and it could be formed by winding multiple wires around one or more of the layers 12, 14, and 16 at a relatively long pitch to provide resistance to internal pressure in the axial direction. The wires can have a circular or rectangular cross-section, can be formed of carbon steel, and can be applied in overlapping layers in alternating helix directions. An example of this layer is manufactured by the assignee of the present invention and marketed under the trademark FLEXLOK.

Figure 2:
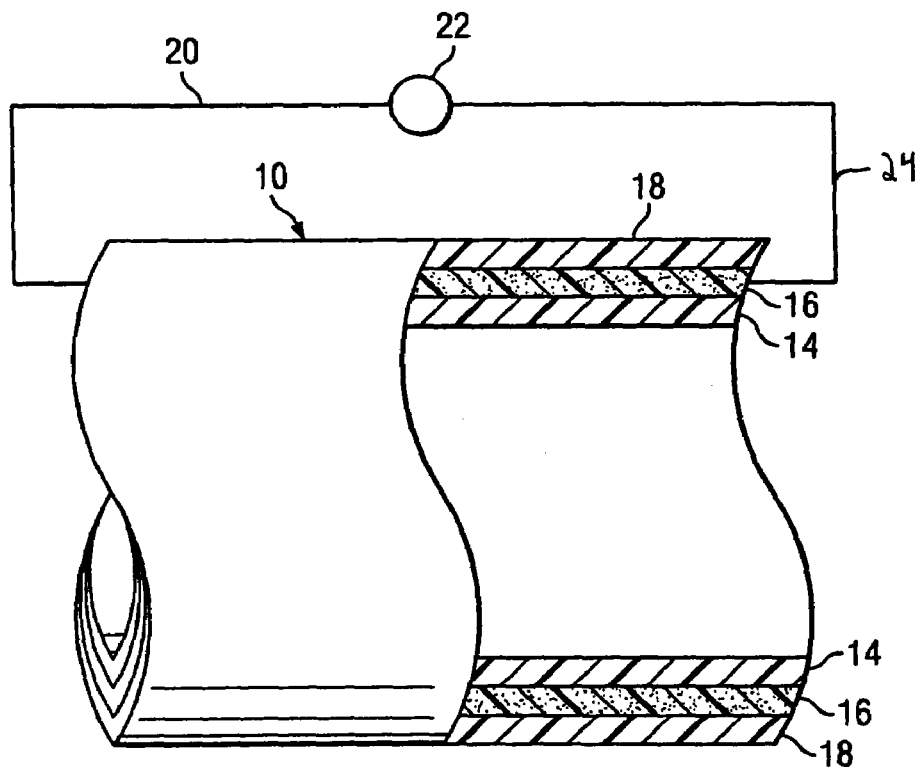
FIG. 2 is a view, similar to that of FIG. 1, but depicting an alternate embodiment of the pipe of the present invention.

The embodiment of FIG. 2 is identical to that of FIG. 1 with the exception that the layer 12 of the embodiment of FIG. 1 has been omitted. Since the structure of the embodiment of FIG. 2 is described above, it will not be described again.

As a result of the above, in both of the above embodiments the fluid being conveyed can be maintained at relatively high temperatures to avoid the problems set forth above.

It should be emphasized that, in the either of the above embodiments, a thermal insulating layer may be applied outside the layer 16, or outside the layer 18, to reduce the amount of power required to heat the pipe to a desired temperature.

VARIATIONS

1. The composition of each of the layers disclosed above can be varied within the scope of the invention.

2. Although the conductor 24 is shown in the drawings as extending between the ends of a relatively short section of the pipe 10, it can also be connected between the ends of relatively long lengths of pipe to heat the pipe, and the fluid being conveyed, in the above manner.

3. One or more of the layers discussed above can be eliminated and, in fact the pipe can consist of only one layer.

4. One or more of the layers discussed above can be replaced by another layer of a different design.

5. Two or more of the layers discussed above can be provided.

6. Additional layers of a different design, such as the armor layers discussed above, and/or tape layers, can be wound over the layers 12, 14 and/or 16.

7. The relative thicknesses of the layers discussed above are shown in the drawing only for the purpose of example, it being understood that these relative thicknesses can be varied within the scope of the invention.

8. The relative radial positions of the layers discussed above can be changed.

9. The adjacent windings of the strip forming the layer 12 do not have to be interlocked.

10. The invention is not limited to use with a flexible pipe but is equally applicable to other pipes such as reinforced thermoplastic pipes and composite pipes.

11. The spatial references, such as "under", "over", "between", "outer", "inner", "around", and "surrounding" are for the purpose of illustration only and do not limit the specific orientation or location of the layers described above.

Although only a few exemplary embodiments of this invention have been described in detail above, those skilled in the art will readily appreciate that many other modifications are possible in the exemplary embodiments without materially departing from the novel teachings and advantages of this invention. Accordingly, all such modifications are intended to be included within the scope of the following claims.

The invention claimed is:

1. A flexible pipe configured to convey hydrocarbon fluids in subsea environments, the pipe comprising a tubular member formed of a plastic material, and a plurality of electrical current conductive materials dispersed in the plastic material for increasing the electrical conductivity of the tubular layer, wherein the electrical current conductive materials are carbon nanotubes.

2. The pipe of claim 1 further comprising an electrical conductor connected to two portions of the tubular layer so that when electrical power is supplied to the conductor, the current flows through the electrical current conductive materials to heat the pipe and the fluids.

3. The pipe of claim 2 wherein the electrical conductor is connected to respective ends of the tubular member.

4. The pipe of claim 1 wherein the electrical conductivity of the electrical current conductive materials is greater than that of the plastic material.

5. The pipe of claim 1 further comprising an electrical power source connected to the electrical conductor, and wherein the amount of electrical power flowing from the power source, and through the conductor and the layer can be varied to control the temperature of the fluid.

6. The pipe of claim 1 wherein the nanotubes are a convex cage of atoms with only hexagonal and/or pentagonal faces.

7. The pipe of claim 1 wherein each nanotube has a single wall with a diameter in the range of 1.2–1.4 nm.

8. The pipe of claim 1 wherein each nanotube has multiple walls.

9. The pipe of claim 1 wherein the nanotubes have a length-to-diameter ratio that is greater than 800.

10. The pipe of claim 1 wherein the density of the nanotubes in the layer is less than the density of metal that would have to be dispersed in the layer to achieve the same electrical conductivity.

11. The pipe of claim 1 wherein the percolation threshold for the nanotubes is less than one half of one percent by volume.

12. The pipe of claim 1 wherein the density of the nanotubes in the layer is less than the density of metal that would have to be dispersed in the layer to achieve the same electrical conductivity.

13. The pipe of claim 1 further comprising a tubular plastic layer, which is surrounded by the tubular member.

14. The pipe of claim 1 further comprising a tubular plastic layer surrounding the tubular member.

15. The pipe of claim 1 further comprising a tubular armor layer, which is surrounded by the tubular member.

16. The pipe of claim 1 further comprising a tubular armor layer surrounding the tubular member.

17. The pipe of claim 1 further comprising a tubular carcass layer which is surrounded by the tubular member.

18. The pipe of claim 17 further comprising a plastic tubular layer extending between the tubular member and the carcass layer.

19. A method of manufacturing a flexible pipe configured to convey hydrocarbon fluids in subsea environments, the method comprising forming the pipe, at least in part, with a tubular member formed of a plastic material, a plurality of electrical current conductive materials being dispersed in the plastic material for increasing the electrical conductivity of the tubular layer, wherein the electrical current conductive materials are carbon nanotubes.

20. The method of claim 19 further comprising electrically connecting an electrical conductor to the tubular member so that when electrical power is supplied to the conductor, the current flows through the electrical current conductive materials to heat the pipe and the fluids.

21. The method of claim 20 further comprising connecting the electrical conductor to respective ends of the tubular member.

22. The method of claim 19 wherein the electrical conductivity of the electrical current conductive materials is greater than that of the plastic material.

23. The method of claim 20 further comprising connecting an electrical power source to the electrical conductor, and varying the amount of electrical power flowing from the power source, and through the conductor and the layer to control the temperature of the fluid.

24. The method of claim 19 wherein the nanotubes are a convex cage of atoms with only hexagonal and/or pentagonal faces.

25. The method of claim 19 wherein each nanotube has a single wall with a diameter in the range of 1.2–1.4 nm.

26. The method of claim 19 wherein each nanotube has multiple walls.

27. The method of claim 19 wherein the nanotubes have a length-to-diameter ratio that is greater than 800.

28. The method of claim 19 wherein the density of the nanotubes in the layer is less than the density of metal that would have to be dispersed in the layer to achieve the same electrical conductivity.

29. The method of claim 19 wherein the percolation threshold for the nanotubes is less than one half of one percent of volume.

30. The method of claim 19 wherein the density of the nanotubes in the layer is less than the density of metal that would have to be dispersed in the layer to achieve the same electrical conductivity.

31. The method of claim 19 further comprising providing a tubular plastic layer, which is surrounded by the tubular member.

32. The method of claim 19 further comprising surrounding the tubular member with a tubular plastic layer surrounding the tubular member.

33. The method of claim 19 further comprising providing a tubular armor layer, which is surrounded by the tubular member.

34. The method of claim 19 further comprising surrounding the tubular member with a tubular armor layer.

35. The method of claim 19 further comprising providing a tubular carcass layer, which is surrounded by the tubular member.

36. The method of claim 35 further comprising providing a plastic tubular layer between the tubular member and the carcass layer.

* * * * *